United States Patent
Yagi et al.

(10) Patent No.: US 6,698,249 B1
(45) Date of Patent: Mar. 2, 2004

(54) POROUS GLASS BASE MATERIAL PRODUCTION DEVICE AND METHOD

(75) Inventors: Kanta Yagi, Kanagawa (JP); Sumio Hoshino, Kanagawa (JP); Wataru Kikuchi, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/807,372

(22) PCT Filed: Aug. 6, 1999

(86) PCT No.: PCT/JP99/04294

§ 371 (c)(1), (2), (4) Date: Jul. 16, 2001

(87) PCT Pub. No.: WO00/23385

PCT Pub. Date: Apr. 27, 2000

(30) Foreign Application Priority Data

Oct. 21, 1998 (JP) .......................... 10-299513

(51) Int. Cl.[7] .............................. C03B 19/14
(52) U.S. Cl. ............... 65/414; 65/421; 65/422; 65/531; 65/532
(58) Field of Search ................ 65/414, 421, 422, 65/531, 532

(56) References Cited

U.S. PATENT DOCUMENTS 5,693,115 A * 12/1997 Ito et al. .................. 65/384

FOREIGN PATENT DOCUMENTS

| JP | 59-174537 | 10/1984 |
| JP | 1-106534 | 7/1989 |
| JP | 1-108504 | 7/1989 |
| JP | 2-164735 | 6/1990 |
| JP | 5-330845 | * 12/1993 |
| JP | 6-316422 | 11/1994 |

OTHER PUBLICATIONS

Abstract of JP 5–330845.*

* cited by examiner

*Primary Examiner*—James Derrington
(74) *Attorney, Agent, or Firm*—McDermott, Will & Emery

(57) ABSTRACT

An object of the present invention is to reduce the adhesion of floating glass particulates to the surface of a soot preform during the manufacture of the soot preform, thereby reducing the voids generated in the transparent glass preform made from the soot preform, and to improve the quality of the optical fiber manufactured from the transparent glass preform. The equipment of the invention is equipped with a reaction vessel 1, a burner 2 provided within the reaction vessel 1 into which raw material gas and combustion gas are supplied so as to generate glass particulates by hydrolysis reaction, and a starting rod 5 onto which the glass particulates generated by the burner 2 are deposited. By drawing up the starting rod 5 while turning it around its axis, the glass particulates are deposited on the tip of or around the starting rod 5 to form a soot preform 6 in column-like shape. The equipment is provided with a partition board 8 that separates part of the space around the soot preform 6 in the reaction vessel 1 into upper and lower parts. An exhaust port 4 is provided below the partition board 8 in the inner wall of the reaction vessel 1, and the burner 2 is installed in the space below the partition board 8.

14 Claims, 4 Drawing Sheets

(A)

(B)

POROUS GLASS BASE MATERIAL PRODUCTION DEVICE AND METHOD

TECHNICAL FIELD

The present invention relates to equipment and a manufacturing method for manufacturing a soot preform for an optical fiber, photomask or the like.

BACKGROUND ART

For manufacturing a soot preform there are widely used methods, such as the VAD method and the OVD method. According to these methods, the gas of raw materials such as silicon tetrachloride and germanium tetrachloride is supplied to a burner together with a combustion gas and the like, and glass particulates that are formed by hydrolysis reaction therefrom are deposited on the tip of or around a starting rod. The soot preform thus produced is dehydrated and sintered, resulting in a transparent vitrified preform. The transparent glass preform is melted by heating, and drawn to form an optical fiber.

FIG. 4 is a sectional view illustrating the main part of equipment in which a soot preform is produced. The numeral 1 shows a reaction vessel, 2 a burner, 2a flame, 3 an air inlet, 4 an exhaust port, 5 a starting rod, 6 a soot preform, and 7 the flow of an air current.

Gases, such as a raw material gas comprising silicon tetrachloride, germanium tetrachloride, etc., a combustion gas such as hydrogen, oxygen, etc., and a separating gas such as argon which delays the mixing of hydrogen and oxygen, are supplied to the burner 2. Then, glass particulates made of quartz simple or quartz substance in which germanium oxidize, etc. is doped are produced in the flame 2a by hydrolysis reaction. Then, the glass particulates thus produced are deposited on the tip of the starting rod 5 or around the starting rod. The starting rod 5 is drawn up while turning around its axis. The deposit of the glass particulates grows in the radial and longitudinal directions of the starting rod, forming the soot preform 6 having an approximately columnar shape.

Part of the glass particulates generated in the flame 2a of the burner 2 are, without accumulating on the soot preform 6, allowed to flow upward by the flow of the high-temperature gas and float on the air current 7 in the reaction vessel. Then, the glass particulates thus floating, after the temperature declines by some degrees, adhere to the surface of the already formed soot preform, as well as the inner wall surface of the reaction vessel, in a different condition as compared with the bulk density of the preform.

When the glass particulates having adhered to the wall surface of the reaction vessel grow and fall off by of their own weight, etc, they will float in the reaction vessel and also adhere to the surface of the soot preform as described above.

The glass particulates having floated as described above and not deposited directly on the preform are in a state where the temperature has become lower as compared with the glass particulates that have been directly deposited on the preform. Accordingly, they differ in the physical properties such as the bulk density, and hence cause voids in the transparent glass preform. The voids tend to break an optical fiber when it is drawn from the transparent glass preform, or deteriorate the optical transmission characteristics of the optical fiber.

DISCLOSURE OF THE INVENTION

The equipment and method for manufacturing a soot preform according to the present invention can restrain the floating of glass particulates in the reaction vessel that would occur if a soot preform is manufactured according to the conventional techniques. The novel equipment and method enables the manufacture of a soot preform from which a transparent glass preform of good quality, and hence a good quality optical fiber, can be produced.

The equipment for manufacturing a soot preform according to the present invention is, as in the case of conventional equipment, provided with a reaction vessel, a burner that generates glass particulates, and a starting rod on which the glass particulates are deposited.

The glass particulates are generated by hydrolysis reaction in the flame formed by burning the combustion gas that is supplied together with raw material gas to the burner provided in the reaction vessel. As in the case of conventional equipment, a soot preform is manufactured in an approximately columnar shape by depositing glass particulates to grow on the tip of the starting rod or around the starting rod while turning the starting rod around its axis and drawing it upward. The equipment according to the present invention is characterized in that a partition board is provided in part of the space around the soot preform in the reaction vessel such that the space is separated into upper and lower parts, and an exhaust port is provided below the partition board in the side wall of the reaction vessel and the burner is positioned in the space below the partition board. By such arrangement, the floating of the glass particulates in the reaction vessel can be limited to the lower part and hence the adhesion of the floating glass particulates to the soot preform can be reduced. As a result, the number of voids formed in the preform can also be reduced when the soot preform is vitrified to transparent glass.

BEST MODE FOR CARRYING OUT THE INVENTION

Figure 1:
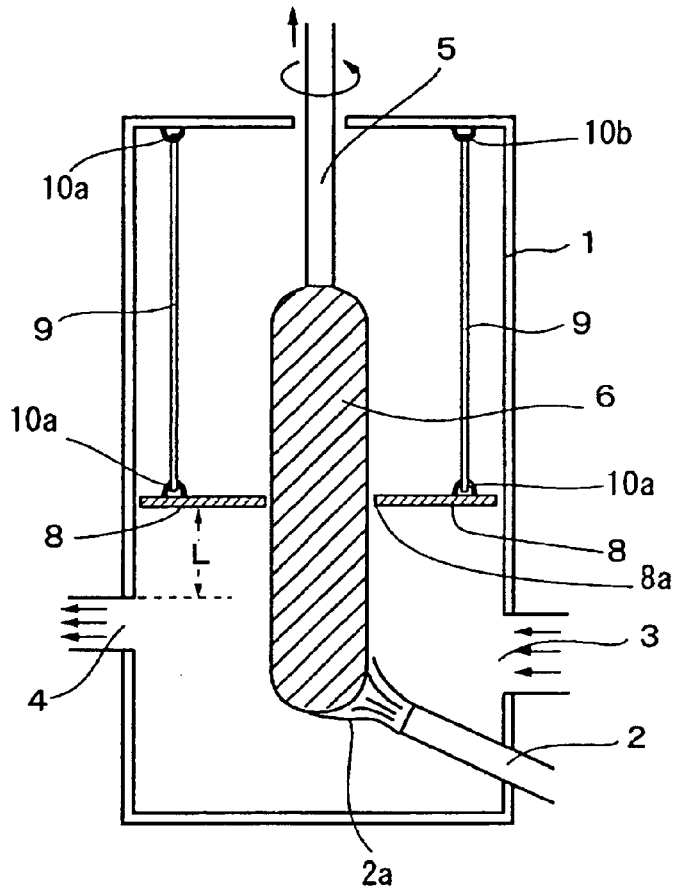
FIG. 1 (A) is a sectional view illustrating an embodiment of the main part of the soot preform manufacturing equipment according to the present invention, and FIG. 1 (B) is a perspective view showing an embodiment of the partition board used in the manufacturing equipment according to the present invention.
Figure 1:
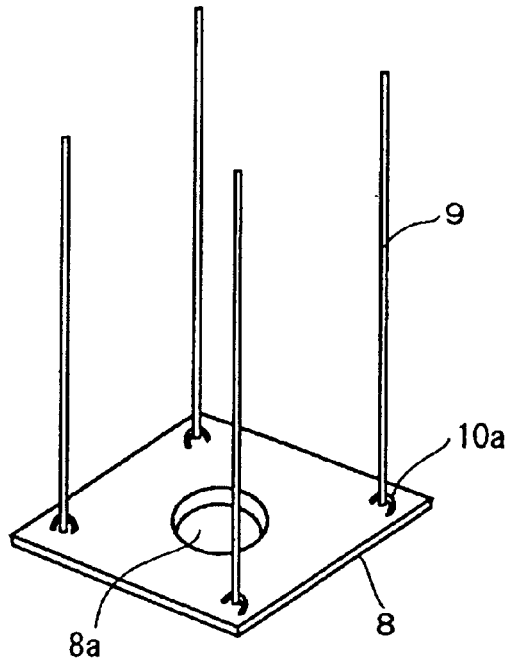
Figure 4:
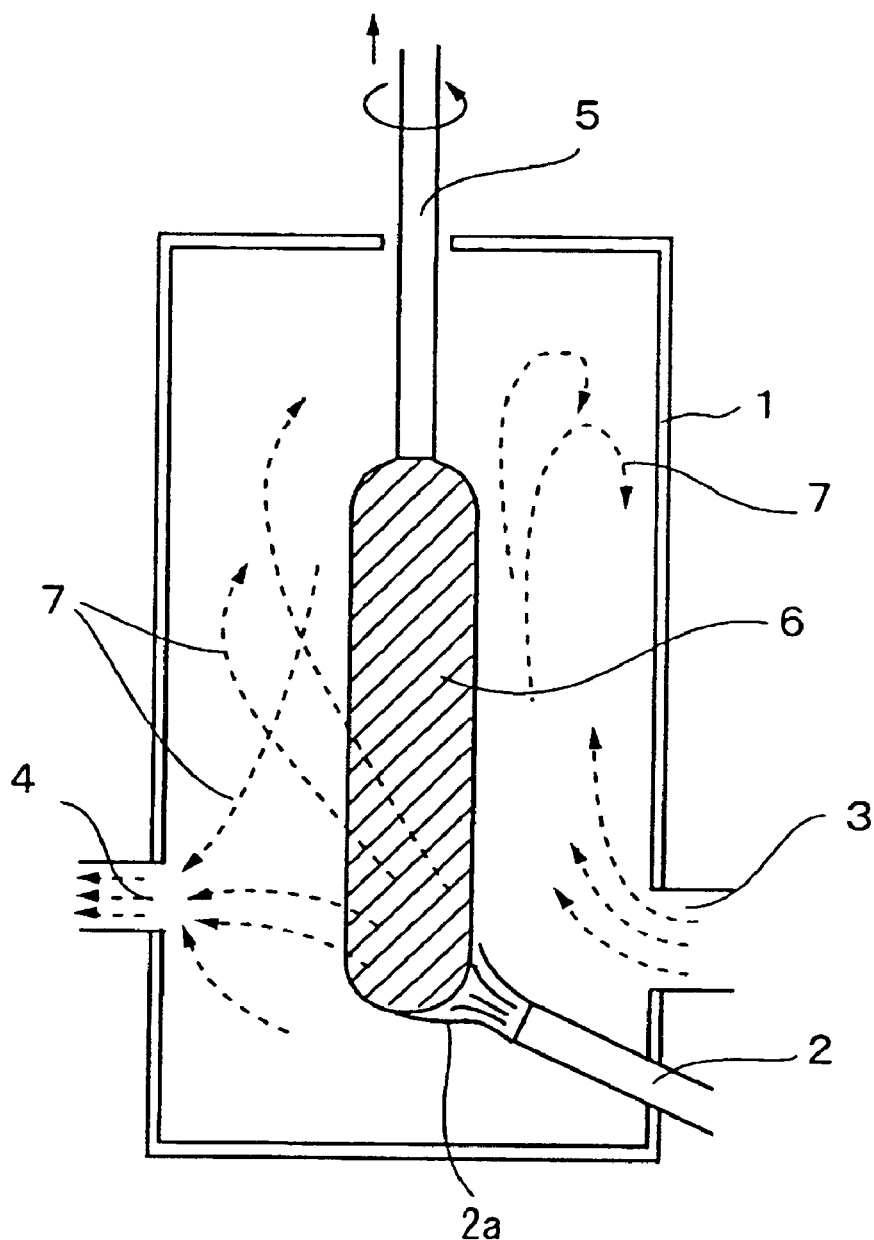
FIG. 4 is a sectional view illustrating the flow of gas from an air inlet in conventional soot preform manufacturing equipment.

FIG. 1 (A) is a sectional view illustrating an embodiment of the main part of the soot preform manufacturing equipment according to the present invention, and the identical signs indicate the same representation in FIG. 4. FIG. 1 (B) is a perspective view showing an embodiment of the partition board used in the soot preform manufacturing equipment according to the present invention. In FIG. 1, the numeral 8 indicates a partition board, 8a a preform passage hole, 9 sling members such as a wire or rod, 10a and 10b hooks.

The partition board 8 is placed maintaining its board surface horizontal as shown in FIG. 1 (A) such that part of the space between the inner wall surface of the reaction vessel 1 and the soot preform 6 is separated into upper and lower parts. The burner 2 is placed in the space below the partition board 8, and the exhaust port 4 is provided below the partition board, in the wall of the reaction vessel. The air inlet 3 is provided in the wall of the reaction vessel, opposite to the exhaust port 4. It is provided according to need and there are cases where no air inlet is provided.

The interval L between the partition board 8 and the exhaust port 4 is preferably 100–400 mm. When the interval L is smaller than 100 mm and the partition board and the exhaust port are too close to each other, the partition board 8 may be heated with the flame of the burner 2 to be deformed. When the interval L exceeds 400 mm, the glass particulates that do not deposit directly onto the soot preform cannot be led to the exhaust port smoothly, and they will float in the reaction vessel. Therefore, more preferably, the interval L is 200–300 mm.

The outer diameter of the soot preform 6 sometimes differs slightly from one preform to another or in terms of the longitudinal direction of the same preform, even if it is the same in design. When the preform passage hole 8a provided in the partition board 8 is narrow, the soot preform 6 may touch the partition board 8 when the soot preform is drawn up through the preform passage hole. Therefore, the gap between the partition board 8 and the preform 6 should be equal to or more than 10 mm. If the gap is sufficiently large for manufacturing several sizes of soot preforms, it is advantageous in that a partition board need not be replaced every time when soot preforms having a different outer diameter in design is manufactured. However, when the gap exceeds 80 mm, the flow of the air current through the gap into the upper part of the space that is above the partition board in the reaction vessel increases, which results in allowing the glass particulates to float within the reaction vessel. Thus, more preferably, the gap is 10–50 mm.

There are cases where manufacturing conditions such as the number of burners provided, the angle of a burner, the kind and the flow rate of gas to be supplied, etc. are changed according to the kind of the preforms to be manufactured. In such cases, it is desirable to make the partition board 8 movable up and down so that the partition board 8 may not be deformed by the heat of the flame from the burner 2. It is therefore preferable to make the partition board 8 movable up and down complying with such need.

Figure 2:
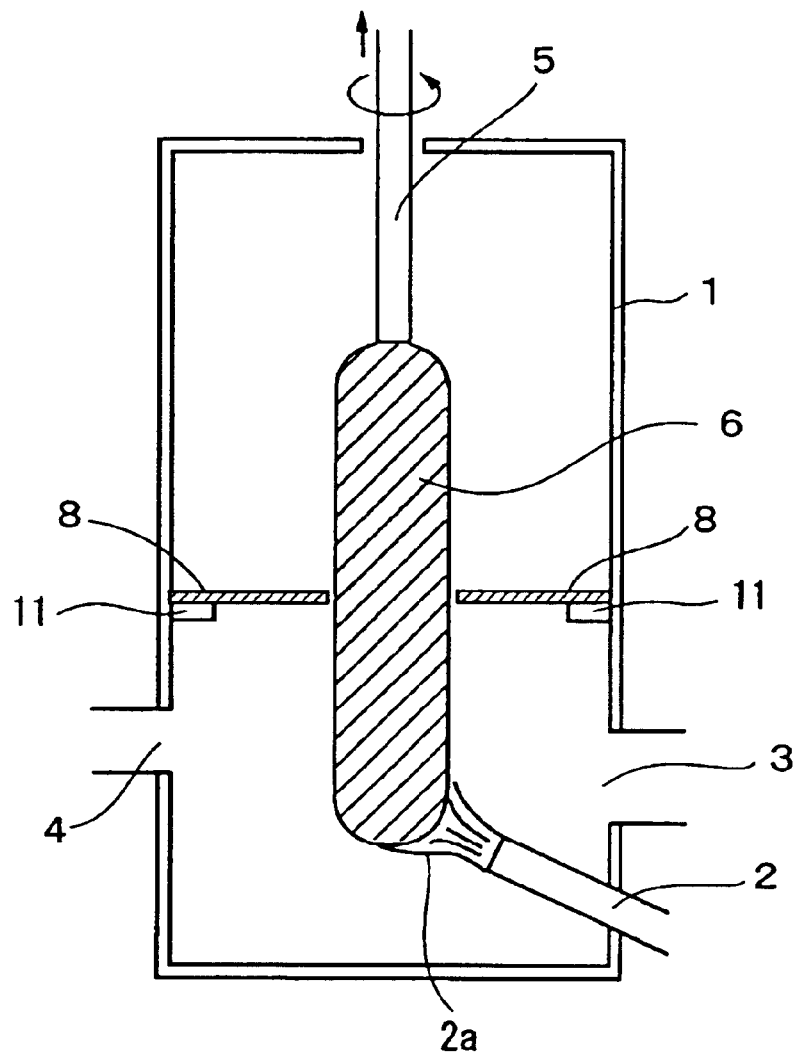
FIG. 2 is a sectional view illustrating an embodiment of the main part of the soot preform manufacturing equipment according to the present invention.

The partition board 8 shown in FIG. 1 (A) is suspended from the top of reaction vessel 1 with sling members 9 such as wires and rods. Therefore, the position of the partition board can be altered only by changing the length of the sling members 9. The partition board 8 shown in FIG. 1 (A) is supported using the sling members 9 and the hooks 10a and 10b that are fixed on the partition board 8 and the ceiling of the reaction vessel 1, respectively. It is possible, however, to support the partition board with support stands 11 fixed on the wall of the reaction vessel 1 as shown in FIG. 2. It is sufficient that the partition board can be moved by altering the length of the sling members because usually the position of the partition board need not be moved while manufacturing a soot preform. In the case in which the position of the partition board needs to be moved during manufacturing, there may be provided a mechanism for the partition board to moved up and down be continuously and stopped at a desired position.

The partition board 8 must be made of a material that has thermal resistance and acid resistance and does not adversely affect the quality of the soot preform for the optical fiber. Nickel, quartz, and silicone carbide have excellent characteristics suitable for the above material. The partition board 8 may use a simple substance out of the above materials, but a complex substance including the above materials can also be used. The sling members 9 and the hooks 10a and 10b are also preferably made of the above materials, such as nickel.

Figure 3:
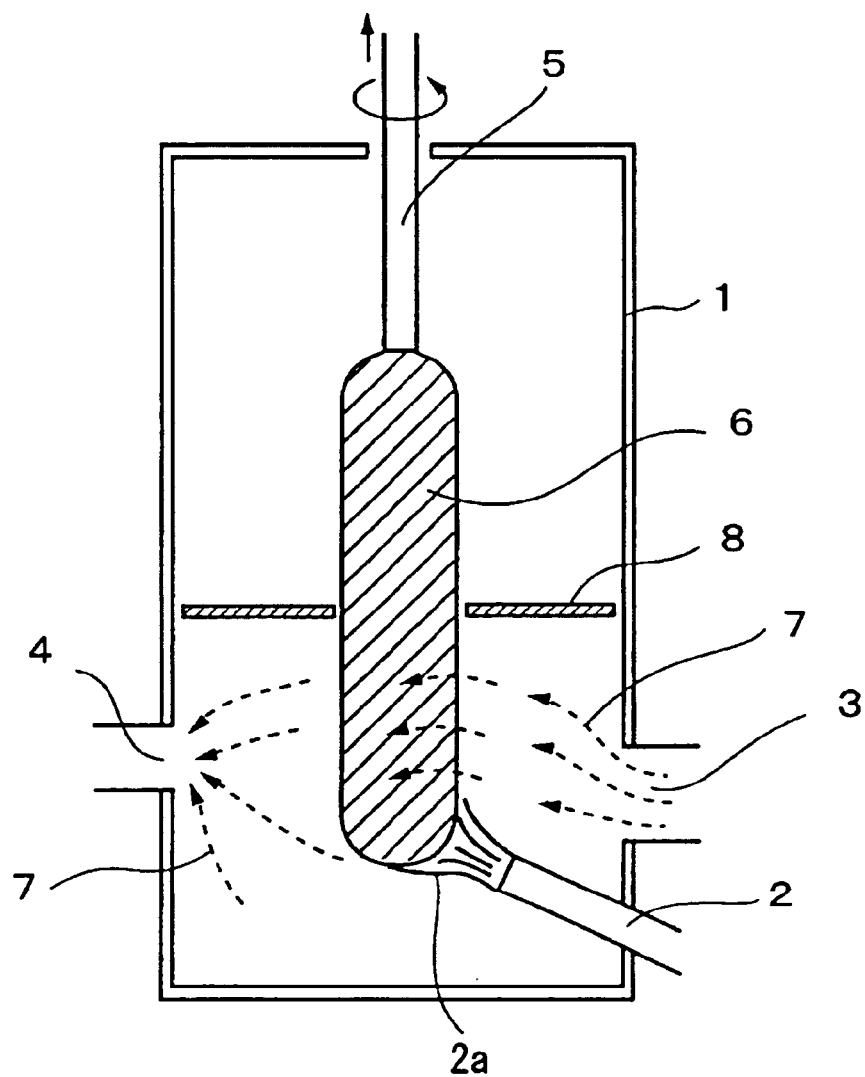
FIG. 3 is a sectional view illustrating the flow of gas from an air inlet in the soot preform manufacturing equipment according to the present invention.

As shown in FIG. 3, if outside fresh air or clean air filtered through an air filter is introduced from the air inlet 3 into the lower space below the partition board 8 while glass particulates are generated within the flame 2a of the burner 2 and deposited on the soot preform 6, the floating glass particulates that do not deposit directly onto the preform 6 tend to flow to the exhaust port 4 with the gas flow 7. As a result, the floating glass particulates that enter through the gap between the preform 6 and the partition board 8 into the space above the partition board 8 decrease. This results in the decrease of the adhesion of the floating glass particulates to the inner wall surface of the reaction vessel 1 and the surface of the preform 6.

EXAMPLE 1

In a reaction vessel 1 made of nickel and having the form shown in FIG. 1 (A) with the dimensions of 400 mm×400 mm in a horizontal cross section, and 1800 mm in height, wherein a partition board 8 made of nickel is provided at a position of 200 mm above from the upper end of an exhaust port 4, soot preforms 6 of 150 mm in outer diameter and 600 mm in length were manufactured. The gap between the partition board 8 and the preform 6 was about 30 mm. After manufacturing 10 pieces of preforms 6, the inside of the vessel 1 was visually inspected. There was little adhesion of the floating glass particulates on the inner wall surface of the space above the partition board in the reaction vessel. Also, when the number of voids having a diameter equal to or more than 1 mm which existed in the preforms was examined about 10 pieces of the preforms mentioned above in a state transparently vitrified by dehydration and sintering, the existence of 0.5 voids per preform was confirmed.

EXAMPLE 2

After manufacturing 10 pieces of preforms 6 in the same manner as in Example 1 except that the gap between the partition board 8 and the preform 6 was about 50 mm, the inside of the reaction vessel was examined. The quantity of the floating glass particulates that adhered to the inner wall surface in the space above the partition board 8 of the reaction vessel was very small, and was not likely to cause any special problem. Also, when the number of the voids having a diameter equal to or more than 1 mm that existed in the preforms was examined about the above 10 pieces of the preforms that were in a state transparently vitrified by dehydration and sintering, the existence of 1.0 voids per preform was confirmed.

EXAMPLE 3

After manufacturing 10 pieces of preforms 6 in the same manner as in Example 1 except that the gap between the partition board 8 and the preform 6 was about 30 mm and the interval between the partition board 8 and the exhaust port 4 was 300 mm, the inside of the reaction vessel was examined. The floating glass particulates were not recognized as having adhered to the inner wall surface in the space above the partition board 8 of the reaction vessel, and consequently wereunlikely to cause any special problem. Also, when the number of the voids having a diameter equal to or more than 1 mm that existed in the preforms was examined about 10 pieces of the above preforms that were in a state transparently vitrified by dehydration and sintering, the existence of 0.9 voids per preform was confirmed.

Comparative Example

After manufacturing 10 pieces of preforms 6 in the same manner as in Example 1 except that the partition board 8 was not provided, the inside of the reaction vessel was examined. The quantity of the floating glass particulates that adhered to the inner wall surface in the space above the partition board 8 of the reaction vessel was considerably large. Also, when the number of the voids having a diameter equal to or more than 1 mm that existed in the preforms was examined about 10 pieces of the above preforms that were in a state transparently vitrified by dehydration and sintering, the existence of 5 voids per preform was confirmed. The number of voids is considerably larger as compared with Examples 1, 2, and 3. It is considered to be due to the numerous floating glass particulates that adhered to the soot preform.

The Applicability in the Industry

The soot preform manufacturing equipment of the present invention is constituted such that a partition board is provided in part of the space around a soot preform in a reaction vessel so that the space is separated into the upper and lower parts. An exhaust port is provided below the partition board in the side wall of the reaction vessel and a burner is positioned in the space below the partition board.

In the equipment of the present invention, the floating of the glass particulates in the reaction vessel can be limited to the lower part and hence the adhesion of the floating glass particulates to the soot preform can be reduced. Since the adhesion of the floating glass particulates to the soot preform can be reduced, the number of voids formed in a transparent glass preform manufactured from the soot preform can be reduced. Also, as a result of the decrease in the quantity of the voids in the transparent glass preform, not only can breakage of an optical fiber be reduced when the transparent glass preform is drawn into the optical fiber by heating and melting, but also excellent optical transmission characteristics of the optical fiber can be attained.

Also deformation of the partition board due to the heat of the burner flame can be prevented, if the partition board is movable up and down. This allows it to be adjusted to the most suitable position to correspond with the change of the manufacturing conditions, such as the number and angle of the burners, and the quantity and kinds of gases, such as a raw material gas, supplied to the burners. If the partition board is made of nickel, quartz, and/or silicone carbide, it does not adversely affect the quality of a soot preform for an optical fiber, and it is possible to achieve a stable manufacturing condition.

What is claimed is:

1. Equipment for manufacturing a soot preform, comprising a reaction vessel, a burner that generates glass particulates, and a starting rod on the tip of or around which said glass particulates are deposited in said reaction vessel, said equipment being further equipped with a partition board which is provided in part of the space around a soot preform in said reaction vessel such that said space is separated into an upper and lower part, an exhaust port is provided below said partition board in the side wall of said reaction vessel, and said burner is positioned in the space below said partition board, wherein said partition board is configured for translation up and down within said reaction vessel and placement at one of a plurality of positions along said reaction vessel.

2. Equipment for manufacturing a soot preform, comprising a reaction vessel, a burner that generates glass particulates, and a starting rod on the tip of or around which said class particulates are deposited in said reaction vessel, said equipment being further equipped with a partition board which is provided in part of the space around a soot preform in said reaction vessel such that said space is separated into an upper and lower part, an exhaust port is provided below said partition board in the side wall of said reaction vessel, and said burner is positioned in the space below said partition board, wherein the interval between said partition board and said exhaust port is 100 to 400 mm.

3. Equipment for manufacturing a soot preform as defined in claim 1, wherein a hole for the passage of said soot preform is provided in said partition board such that the gap between said partition board and said soot preform is 10 to 80 mm.

4. Equipment for manufacturing a soot preform, comprising a reaction vessel, a burner that generates glass particulates, and a starting rod on which the glass particulates are deposited, said equipment being further equipped with a partition board which is provided in part of the space around a soot preform in said reaction vessel such that the space is separated into an upper and lower part, an exhaust port is provided below said partition board in the side wall of said reaction vessel, and said burner is positioned in the space below said partition board, wherein said partition board is suspended by sling members from an upper position of said reaction vessel such that said partition board is movable up and down.

5. Equipment for manufacturing a soot preform as defined in claim 1, wherein said partition board is made of one or more materials selected from the group consisting of nickel, quartz, and silicone carbide.

6. Equipment for manufacturing a soot preform as defined in claim 1, wherein an air inlet is provided at a position opposite to said exhaust port below said partition board, in the wall of said reaction vessel.

7. A method for manufacturing a soot preform by depositing glass particulates in a reaction vessel, which are generated by hydrolysis reaction caused by combustion gas and raw material gas supplied to a burner provided in said reaction vessel, on the tip of or around a starting rod while turning said starting rod around its axis and drawing it up, said reaction vessel having a partition board provided in part of the space between said soot preform and the inner wall of said reaction vessel at a position above an exhaust port and said burner which are provided in the wall of said reaction vessel such that said space is separated into the upper and lower parts, wherein said partition board is configured for translation up and down within said reaction vessel and placement at one of a plurality of positions along said reaction vessel.

8. A method for manufacturing a soot preform comprising:
providing a reaction vessel comprising a partition board provided between a soot preform disposed in said reaction vessel and an inner wall of said reaction vessel, said partition board being disposed between about 100 to 400 mm above an exhaust port provided in the wall of said reaction vessel so as to separate the reaction vessel into an upper part and a lower part, said lower part comprising a burner,
supplying combustion gas and raw material gas to said lower part of said reaction vessel, using said burner to combust said combustion gas and raw material gas to produce a hydrolysis reaction, depositing glass particulates generated by said hydrolysis reaction on the tip of or around a starting rod while turning said starting rod around its axis and drawing it up, exhausting combustion products comprising non-deposited glass particulates and any non-combusted combustion gas and raw material through said exhaust port.

9. Equipment for manufacturing a soot preform, comprising a reaction vessel, a burner that generates glass particulates from a supplied combustion gas and raw material gas, and a starting rod on the tip of or around which said glass particulates are deposited in said reaction vessel, said equipment being further equipped with a partition board which is provided in part of the space around a soot preform in said reaction vessel such that said space is separated into an upper and lower part, an exhaust port is provided below said partition board in the side wall of said reaction vessel, and said burner is positioned in the space below said partition board, wherein an interval between said partition board and said exhaust port is 100 to 400 mm.

10. Equipment for manufacturing a soot preform as defined in claim 9, wherein a hole for the passage of said soot preform is provided in said partition board such that the gap between said partition board and said soot preform is 10 to 80 mm.

11. Equipment for manufacturing a soot preform as defined in claim 9, wherein a hole having a predetermined fixed diameter is provided in said partition board to permit the vertical translation of said soot preform therethrough, said predetermined fixed diameter being selected such that the gap between said partition board and an outermost diameter of said soot preform is between about 10 to 80 mm.

12. Equipment for manufacturing a soot preform as defined in claim 9, wherein an air inlet is provided at a position substantially opposite to said exhaust port below said partition board, in the wall of said reaction vessel.

13. Equipment for manufacturing a soot preform, comprising a reaction vessel, a burner that generates glass particulates, and a starting rod on which the glass particulates are deposited, said equipment being further equipped with a partition board which is provided in part of the space around a soot preform in said reaction vessel such that the space is separated into an upper and lower part, an exhaust port is provided below said partition board in the side wall of said reaction vessel, and said burner is positioned in the space below said partition board, wherein said partition board is configured for translation up and down within said reaction vessel over a predetermined interval.

14. Equipment for manufacturing a soot preform in accord with claim 13, wherein said predetermined interval comprises at least a first position about 100 mm from said exhaust port and a second position about 400 mm from said exhaust port.

* * * * *